April 22, 1958     O. A. KERSHNER     2,831,552
SELF-ENERGIZING MULTIPLE DISC BRAKE AND MECHANICAL
OPERATING MEANS THEREFOR
Filed March 1, 1954     6 Sheets-Sheet 3

INVENTOR.
O. A. Kershner
BY Robb & Robb
Attorneys

April 22, 1958 O. A. KERSHNER 2,831,552
SELF-ENERGIZING MULTIPLE DISC BRAKE AND MECHANICAL
OPERATING MEANS THEREFOR
Filed March 1, 1954 6 Sheets-Sheet 4

INVENTOR.
O. A. Kershner
BY
Robb & Cobb
Attorneys.

April 22, 1958 O. A. KERSHNER 2,831,552
SELF-ENERGIZING MULTIPLE DISC BRAKE AND MECHANICAL
OPERATING MEANS THEREFOR
Filed March 1, 1954 6 Sheets-Sheet 5

INVENTOR.
O. A. Kershner
BY
Robb & Robb
Attorneys.

April 22, 1958     O. A. KERSHNER     2,831,552
SELF-ENERGIZING MULTIPLE DISC BRAKE AND MECHANICAL
OPERATING MEANS THEREFOR
Filed March 1, 1954     6 Sheets-Sheet 6

INVENTOR.
O. A. Kershner
BY Robbey Cobb
Attorneys

United States Patent Office 2,831,552
Patented Apr. 22, 1958

2,831,552

SELF-ENERGIZING MULTIPLE DISC BRAKE AND MECHANICAL OPERATING MEANS THEREFOR

Osborn A. Kershner, St. Joseph, Mich., assignor, by mesne assignments, to Lambert Brake Corporation, St. Joseph, Mich., a corporation of Michigan Application March 1, 1954, Serial No. 413,203

1 Claim. (Cl. 188—72)

The present invention relates to disc brakes, and more particularly to an improved multiple disc brake of the self-energizing type, and to novel means for mechanically effecting the actuation of the brake, while permitting torque-responsive energization thereof.

One object of the present invention is to provide a multiple disc, self-energizing brake which is adapted for association with a vehicle wheel, and principally with the traction wheels of conventional farm tractors, for retarding movement of the vehicle or for aiding in the steering thereof.

Brakes of the same general type as the present one have heretofore been extensively and successfully used on farm tractors as a countershaft brake, and an object of this invention is to adapt this type of tractor brake for use as a wheel axle shaft brake, with attending advantages of directly applying the braking force to the vehicle wheel, as distinguished from applying braking force to a countershaft which brakes the vehicle wheels through gear and shaft mechanism.

Among further objects is the provision of a brake as aforesaid which is adapted for application to a tractor wheel under normal space allowance conditions, and the provision of a modified form of brake disc which is particularly adapted for use where the available space for the installation of the brake is very limited, such as where the tractor wheels are disposed in relatively close relation to the axle housing of the tractor, thus allowing very little free space between the wheel and the axle housing for the disposition of a brake of adequate size and capacity.

In self-energizing multiple disc brakes of the type herein disclosed, certain of the discs are mounted for both relative rotative and relative axial shifting movements, so as to effect initial actuation of the brakes. These actuating discs, for the purpose of allowing self-energization, are also free to rotate together as a unit for a limited extent, responsive to braking torque, until one of the discs abuts with an anchor, while the other disc remains free for further rotative movement responsive to braking torque and responsive to actuating pressure. A further object of the invention, therefore, is to provide such a multiple disc brake with a novel and more simple means for absorbing the torque from the actuating discs and acting as an anchor for the actuating discs. This objective contemplates the use of fastener screws which serve the dual purpose of securing together the complementary sections of which the brake housing is usually composed and of acting as fixed abutments or anchors for the actuating discs.

Still another object is to provide novel mechanical means for operating the aforesaid actuating discs, this operating means including a rockable actuator shaft and means for effecting relative rotative movements of the actuating discs responsive to rocking of said shaft, and the shaft being free to shift bodily with the actuating discs to permit braking torque-responsive rotation or "clocking" of the discs.

Other objects and advantages of the present invention and the specific structure which attains the foregoing objectives will be hereinafter described or will become apparent to those skilled in the art, and the novel features thereof will be defined in the appended claim.

In the drawings.

Like reference characters in the following description and in the several views of the drawings designate corresponding parts.

Figure 1:
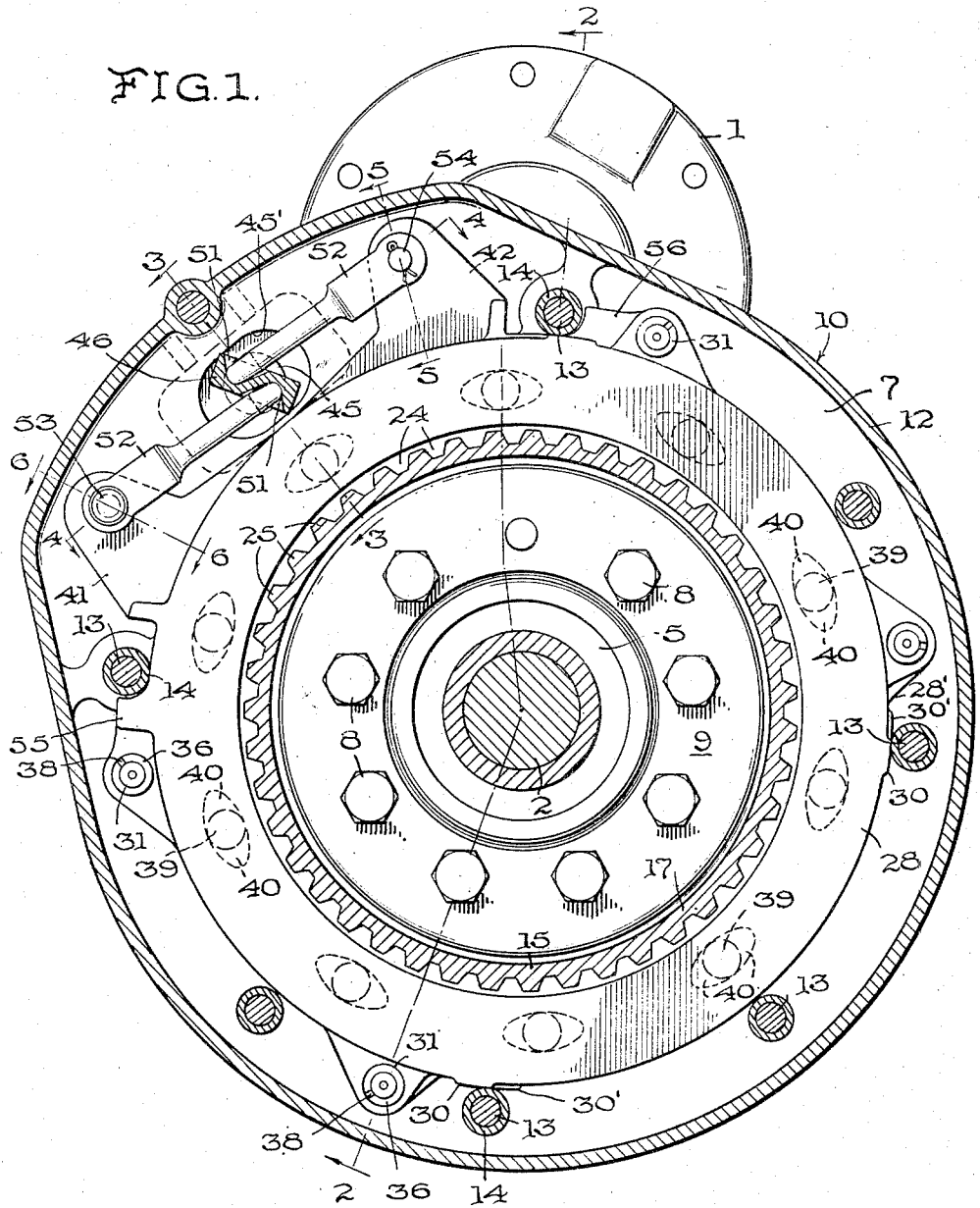
Fig. 1 is a view showing one illustrative form of the present brake as applied to a drive axle for a tractor vehicle, with the tractor wheel omitted and with the axle and a portion of the brake-mounting means broken away and shown in section to better disclose the interior construction of the brake assembly, this view being a section taken substantially on the line 1—1 of Fig. 2.
Figure 2:
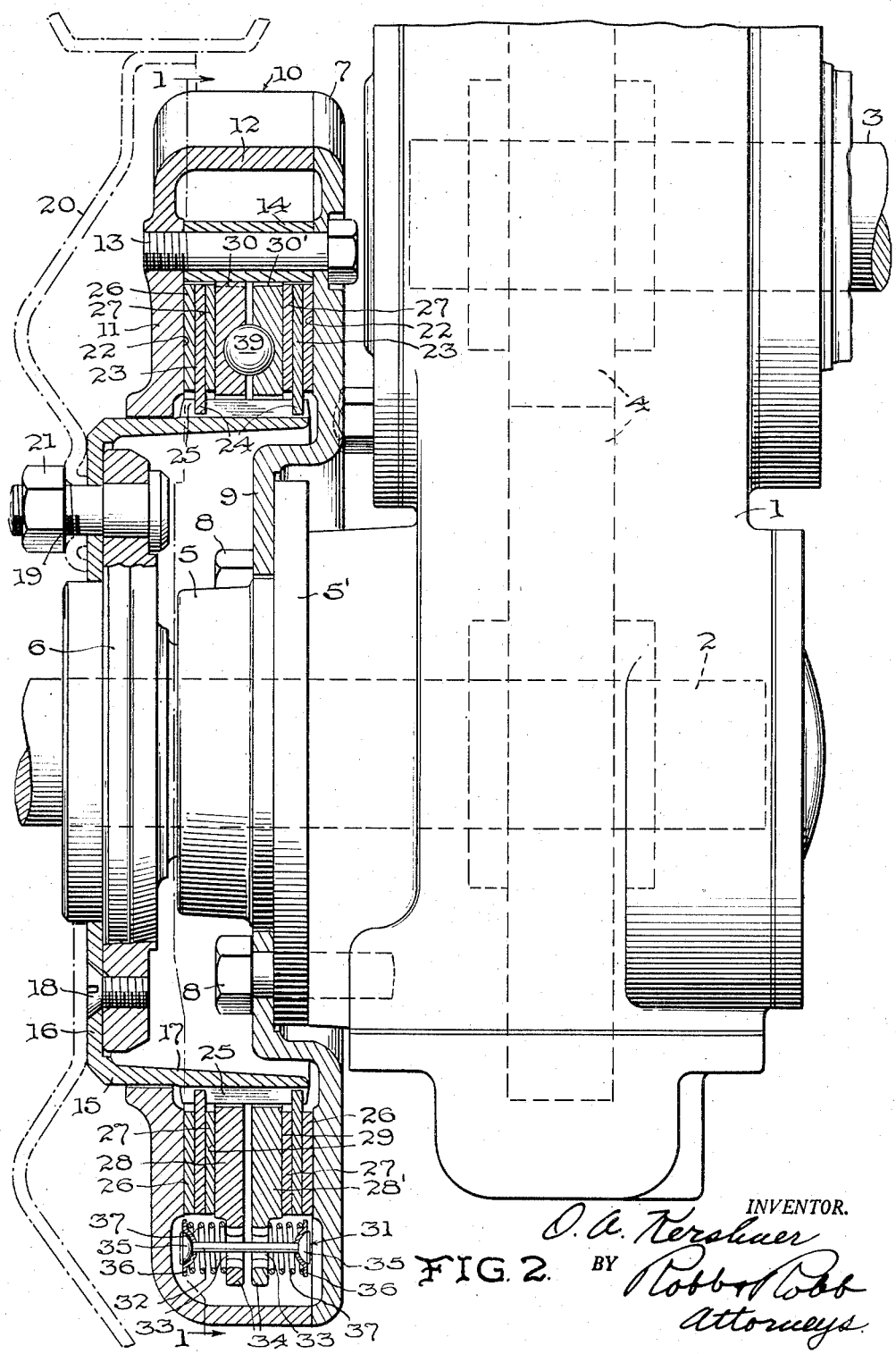
Fig. 2 is a view in section and on an enlarged scale, as taken on the line 2—2 of Fig. 1, with certain of the parts shown in elevation.
Figure 3:
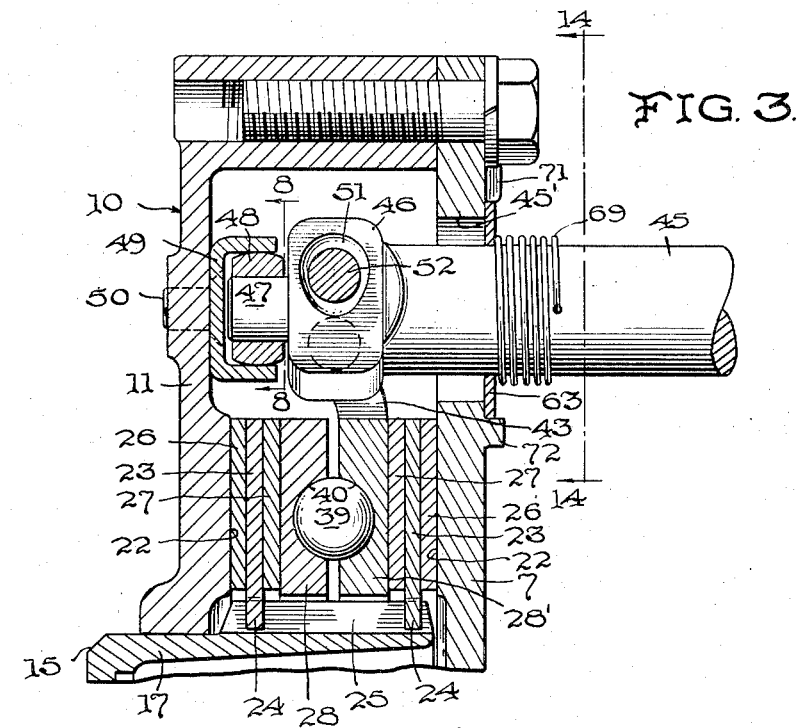
Fig. 3 is an enlarged fragmentary view in section, as taken on the line 3—3 of Fig. 1.

As aforementioned, the brake of this invention is adapted to be associated with the axle housing and axle of a conventional farm tractor, and for illustrative purposes only, an axle housing 1 of a conventional farm tractor is shown in Figs. 1 and 2, this housing containing a short axle shaft 2 which is suitably driven by a shaft 3 through the intermediary of intermeshed gearing 4, the shaft 3 being under the control of the power transmission system of the tractor to drive the axle 2. The axle 2 projects outwardly through a radially flanged bearing support 5 of the housing 1, and on the outer end of the axle 2, there is provided a flanged wheel-mounting hub 6.

An inboard brake housing section 7 having a central opening therethrough is disposed about the axle bearing support 5 and secured to the flange 5' of the bearing support 5, as by means of a plurality of screws 8, the central portion 9 of the housing section 7 being axially offset in an outward direction, whereby the main body of the housing section is disposed in closely adjacent relationship to the housing 1, as is best seen in Fig. 2.

An outboard housing section 10, having a wall 11 disposed in opposed spaced relation to the inboard housing section 7 and having an outer marginal wall 12 disposed in right-angular relation to the wall 11, is connected to the inboard housing section 7 by means of a suitable number of fastener screws 13, or the like. A cylindrical spacer 14 is mounted on each screw 13 and maintains a rigid spaced relationship between the inboard and the outboard walls of the housing sections, while eliminating strain on the housing from the screws 13.

The wall 11 of the outboard housing section 10 has a relatively large central opening therethrough, and a brake disc-supporting hub member 15 having a radially disposed wall or rim 16 and an axially extended marginal flange 17, is disposed within the central opening in the housing section 10, with the marginal flange 17 projecting into the housing. The wall 16 of the hub 15 is suitably fastened to the flanged wheel-mounting hub 6, as by means of a suitable number of countersunk screws 18, and wheel-mounting bolts 19 further secure the hub 15 in place when a tractor wheel 20 is secured to the wheel-mounting hub 6 by means of a nut 21 on each bolt 19.

Thus, there is provided a fixed, hollow brake housing and a disc-supporting hub rotatably disposed in the housing, and the housing is provided with opposed, axially spaced and radially extended friction faces 22, 22 interiorly thereof, for frictional engagement with friction disc means.

The friction disc means comprises a pair of friction discs 23, 23 of annular form. The inner peripheries of the discs are splined as at 24, and the discs are mounted on the flange 17 of hub 15 by engagement of the splines 24 with mating splines 25 formed on the outer periphery of the flange 17, whereby the discs 23 are free for axial shifting movements on the hub 15, while being positively connected to the hub 15 for rotation therewith. Each disc 23 is provided on its face adjacent to one of the housing friction faces 22 with segments 26 of friction lining material, and on the opposite face of each disc, there is also provided friction lining material segments 27 adapted to be frictionally engaged with a pair of relatively rotatable and axially shiftable actuator discs 28 and 28', the actuator disc 28 being the outboard disc, and the actuator disc 28' being the inboard disc.

These actuator discs 28, 28' are in the form of generally annular rings having radially extended friction faces 29 engageable with the aforementioned friction lining segments 27. The outer margin of the outboard actuator disc 28 is provided with a plurality of slight radial bearing projections 30, these bearing projections 30 being so spaced circumferentially as to be in supporting engagement with certain of the spacer sleeves 14 on screws 13 which connect the housing sections 7 and 10 together, and the inboard actuator disc 28' is also provided with a plurality of radial bearing projections 30' which are also adapted for supporting engagement with certain of the sleeves 14. Thus, the actuator discs 28, 28' are concentrically supported within the brake housing for both axial and rotative movements.

For resiliently biasing the actuator discs towards one another, there is provided a plurality of brake release or return spring assemblies 31. As is best seen in Fig. 2, each spring assembly 31 comprises a connecting pin 32 which extends through a pair of alined openings 33 in a pair of radially projecting opposed ears 34, 34, one ear 34 being formed on each of the discs 28, 28'. At opposite ends of the pin 32, it is formed with a semi-spherical head 35 with which a spring seat or retainer 36 is removably engaged. A coiled compression spring 37 is interposed between each spring seat 36 and the opposed ear 34 on the respective discs 28, 28'. As is best seen in Fig. 1, the spring seats or retainers 36 are each provided with a radial slot extending to the center thereof, whereby the retainers 36 may be removed from the pins 32 for assembly and disassembly of the spring assemblies 31.

Means are interposed between the actuating discs 28, 28' for effecting axial spreading thereof responsive to relative rotative movements of the discs 28, 28', these means preferably being in the form of a plurality of hardened balls 39 disposed in oppositely inclined ramped seats 40 formed in the opposed faces of the respective discs 28, 28', these balls 39 normally being maintained in the deepest part of the opposed seats 40 by the pressure of the return spring assemblies 31 tending to shift the discs 28, 28' towards one another.

The outboard actuating disc, i. e. the disc 28 nearest the vehicle wheel 20, is provided with a radially extended ear 41 and the inboard actuating disc (the disc 28' nearest the axle housing 1) is provided with a radially extended ear 42 disposed in spaced relation to the aforesaid ear 41, the ear 41 on the disc 28 being laterally offset as at 43, and the ear 42 on the disc 28' being laterally offset at 44, whereby the ear 41 on the outboard disc 28 slightly overlies the inboard disc, and the ear 42 on the inboard disc 28' slightly overlies the outboard disc, for a purpose which will be hereinafter more fully described.

Suitable means are provided for effecting relative rotative movements of the discs 28, 28' to engage the brake through the action of the camming balls 39. This operating mechanism includes a rockable actuator shaft 45 which projects into the brake housing through an opening 45' in the inboard housing section 7, the inner end of the shaft 45 being disposed substantially midway between the ears 41 and 42 on the actuator discs 28, 28'. The actuator shaft 45 is formed with a diametrically extended actuator head 46 of generally rectangular form, and at its extreme inner end, the shaft 45 is formed with a reduced cylindrical extension 47 on which is rotatably mounted a roller 48. The roller 48 is adapted to be supported in a bracket 49 of U-shaped channel cross-section which is secured to the wall 11 of the outboard housing section 10, as by means of a pair of screws 50, whereby the inner end of the shaft 45 is supported for rocking movements, as well as for bodily shifting movements, as will be hereinafter more fully described. Any suitable means (not shown) may be utilized for rocking the shaft 45, such as a foot-operated pedal mechanism or a hand-operated lever mechanism, as may be preferred.

Formed in opposite sides of the actuator head 46 is a pair of generally conical sockets 51, in each of which is seated a rounded end of a thrust link 52. One of the thrust links 52 is pivotally connected at its other end with the ear 41 on the outboard disc 28 by means of a pivot pin 53 or the like, this link 52 being forked or bifurcated so as to straddle the ear 41, and the pin 53 extending through the forked end of the thrust link 52 and through the ear 41. The other thrust link 52 is likewise pivotally connected at its other end to the ear 42 on the inboard actuator disc 28', as by means of a pivot pin 54. Accordingly, upon rocking movement of the shaft 45 in one direction, the links 52 will effect a relative rotation of the discs 28, 28' by forcing the ears 41 and 42 away from one another. Such relative rotation of the discs 28, 28' will cause axial separation thereof by the camming action of the balls 39, and the discs 28, 28' will engage the friction discs 23 and shift these friction discs into engagement with the opposed friction faces 22 in the brake housing.

Figure 4:
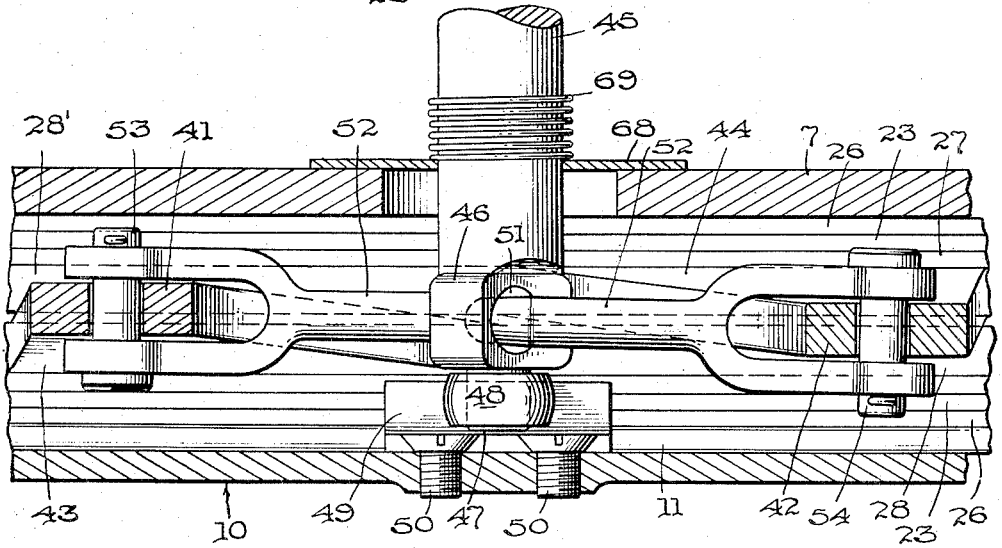
Fig. 4 is an enlarged fragmentary view in section, as taken on the line 4—4 of Fig. 1.
Figure 5:
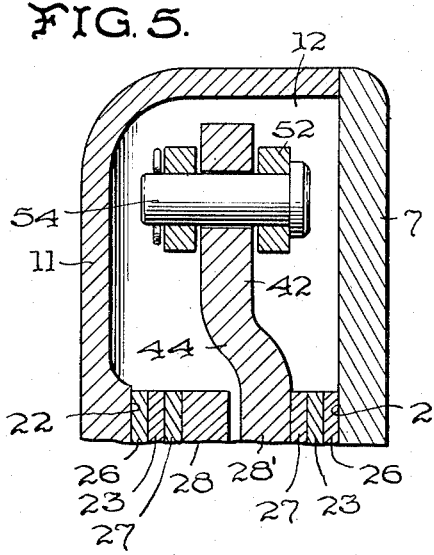
Fig. 5 is an enlarged fragmentary view in section, as taken on the line 5—5 of Fig. 1.
Figure 6:
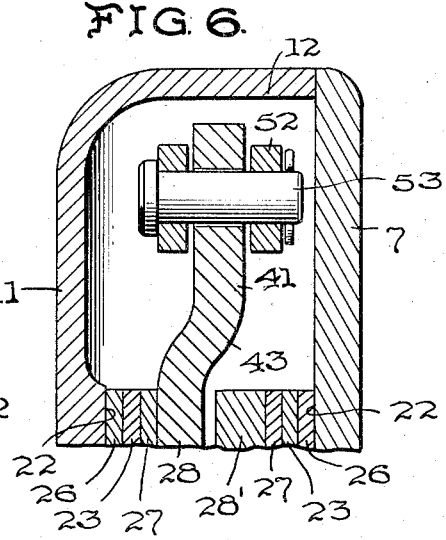
Fig. 6 is an enlarged fragmentary view in section, as taken on the line 6—6 of Fig. 1.
Figure 7:
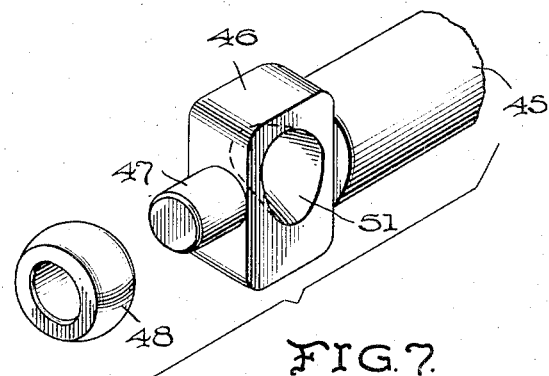
Fig. 7 is an enlarged and exploded detail view in perspective, showing the brake-operating end of a rockable actuator shaft and a roller support therefor, for use in operating the brake of Fig. 1.
Figure 8:
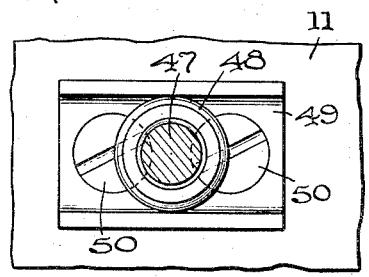
Fig. 8 is a view in section, as taken on the line 8—8 of Fig. 3.
Figure 13:
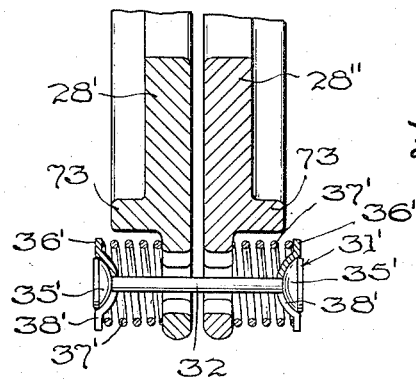
Fig. 13 is a detail view in section, showing a portion of the modified actuator discs and one of the return springs.
Figure 9:
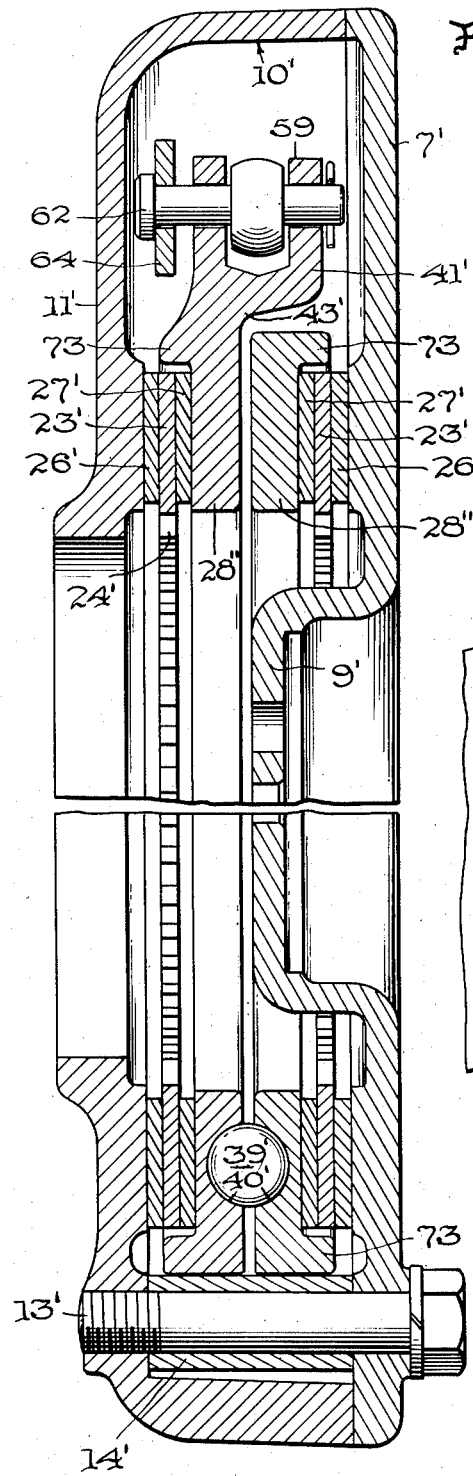
Fig. 9 is a view in transverse section of a brake generally similar to that shown in Figs. 1 to 8, but having a somewhat modified form of actuating discs and operating means for the actuating discs.
Figure 12:
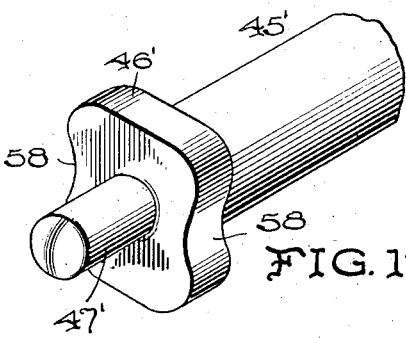
Fig. 12 is a detail view in perspective, showing the brake-operating end of a rockable actuator shaft for use in operating the brake of Fig. 9.

As is best illustrated in Fig. 4, the sockets 51 in the actuator head 46 are located substantially on a median plane between the actuator discs 28 and 28', and the ears 41 and 42 on the respective actuator discs are offset into slightly overlaying relation to the other disc. Therefore, the thrust links 52, 52 are disposed at a slight angle running from the aforesaid median plane to the side of this plane opposite to the side of the plane on which the respective discs are disposed. Accordingly, when the discs are shifted axially apart by the camming action of the balls 39 as the links 52 cause relative rotation of the discs, the links 52 will rock on their rounded ends and swing towards said median plane until the brake is fully engaged, or beyond said median plane until the brake is fully engaged in a brake having worn friction linings.

In any case, the angular disposition of the links 52 relative to the median plane between the discs 28, 28' will at all times be maintained relatively slight, and the thrust transmitted from the actuator head 46 to the discs 28, 28' will be practically in line with the discs throughout the life of the friction linings. Therefore, only a slight amount of free play need be provided in the pivotal connection of the links 52 with the ears 41 and 42.

The initial engagement of the friction discs 23 with the housing will cause the actuator discs 28, 28' to clock with the friction discs until one of the actuator discs or the other is anchored against rotative movement, depending upon the direction of rotation of the discs 23. Accordingly, means is provided for anchoring the respective actuator discs 28, 28', depending upon the direction of rotation of the friction discs 23, and as is best seen in Fig. 1, this anchor means comprises a radially extended anchor lug 55 formed on the outer periphery of the outboard actuator disc 28 for abutting contact with a sleeve 14 on the screw 13 adjacent to the ear 41 on this actuator disc. Likewise, the inboard actuator disc 28' is formed on its outer margin with a lug 56 which is adapted to anchor on the spacer sleeve 14 on the screw 13 adjacent to the ear 42 on the inboard actuator disc. Thus, when the friction discs 23 of the illustrated brake in Fig. 1 are rotating in a clockwise direction, the lug 55 on the outboard actuator disc 28 will limit the rotation of this actuator disc in the direction of rotation of the friction discs 23, while the inboard actuator disc 28' is free to continue its clockwise rotation, responsive to the drag torque of the contiguous friction disc 23, with the result that the brake will be self-energized by the camming action of the balls 39 as they ride up the oppositely ramped seats 40. On the other hand, when the friction discs 23 are rotating in a counter-clockwise direction, the anchor lug 56 on the inboard actuator disc 28' will limit the rotation of this inboard disc in the direction of rotation of the friction discs 23, while the outboard actuator disc 28 remains free for rotation responsive to the drag torque of the contiguous friction disc 23 and responsive to the actuating force of the actuator means just described.

When the actuator shaft 45 is rocked in a direction to permit the ears 41 and 42 on the actuator discs 28, 28' to shift towards one another, the spring assemblies 31 on the actuator discs 28, 28' will urge the two actuator discs towards one another, causing the balls to ride back down into the deepest portions of the ramped seats 40. Thus, the brake will be released and the friction discs 23 will be free to rotate along with the vehicle wheel and the disc-mounting hub 15, without frictional engagement with the actuator discs and the friction surfaces within the brake housing.

In Figs. 9 through 13, there is shown a modified brake which generally corresponds to that just described, and where the parts correspond, the elements of the modified construction are designated with primed reference characters, but where the elements are modified, new reference characters are utilized.

It is to be understood that the friction discs 23' of Figs. 9 through 13 would be splined on a disc-supporting hub 15 as in the brake illustrated in Figs. 1 through 8, and the brake housing would be secured to the flanged axle housing 5 similarly to the way it is shown in the previously described brake.

A modified form of brake actuating means is utilized in the modified brake, and in this connection, the actuator shaft 45' is provided with a modified actuator head 46' having in its respective opposite faces a transversely extended arched depression 58 forming camming surfaces. The ears 41' and 42' are each forked or bifurcated as at 59, and mounted within the fork of the respective ears is a roller element 61, one roller 61 being secured in the bifurcation or fork 59 of the ear 41' by a pin 62, and the other roller 61 being secured in the fork 59 of the ear 42' by means of a pin 63. The axial extension 47' on the actuator shaft 45' passes through a shaft supporting plate 64 which is formed with a central opening 65 for receiving the end 47' of the shaft. The plate 64, adjacent to its opposite ends, is provided with a pair of longitudinally extended slots 66 through which the pins 62 and 63 extend, whereby the plate 64 is bodily supported upon the ears 41' and 42' of the actuator discs 28'', 28''', with the elongated slots 66 providing for relative rotative movements of the actuator discs 28'', 28''', upon rocking movements of the shaft 45'.

This relative rotative movement of the discs 28'', 28''' is effected by the camming action of the actuator head 46' on the rollers 61, as the head is caused to rotate slightly, thus camming the rollers 61 up out of the depressions 58 in the sides of the head 46'.

The operation of the brake shown in Figs. 9 through 13 is the same as that previously described and should be clear without further description.

Figure 14:
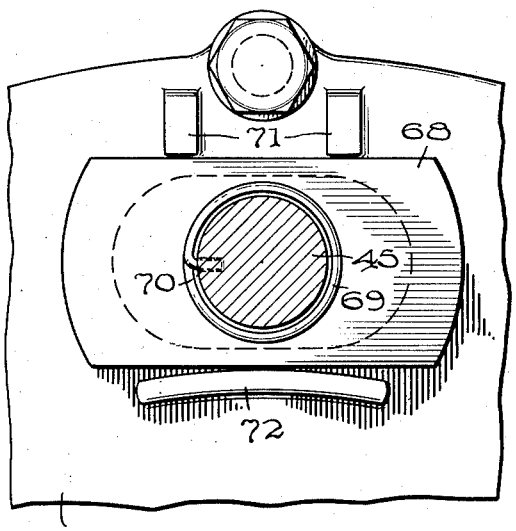
Fig. 14 is a view in section, as taken on the line 14—14 of Fig. 3.
Figure 10:
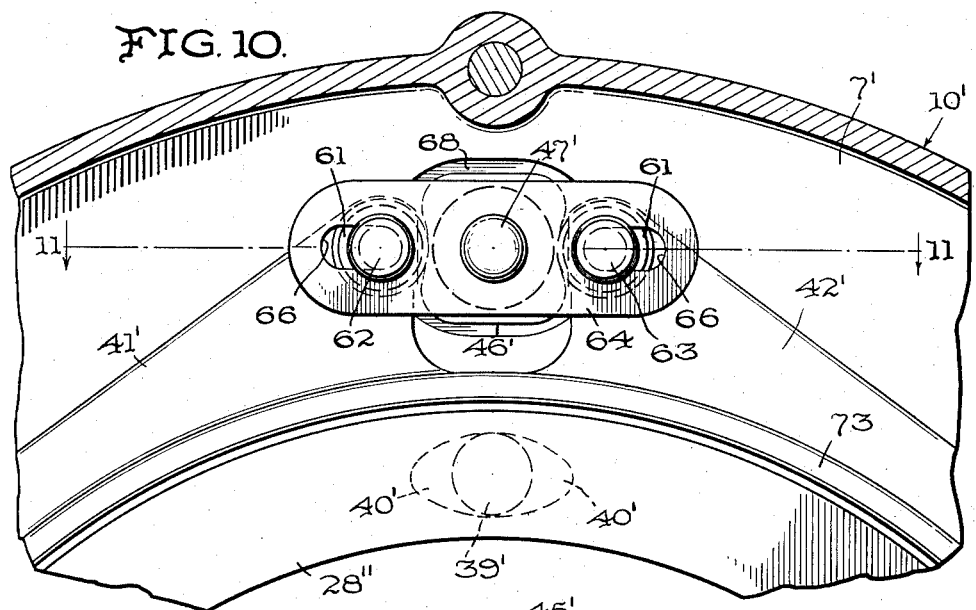
Fig. 10 is a fragmentary view in elevation of the brake of Fig. 9, particularly illustrating the modified operating means, with the outboard portion of the housing broken away and shown in section.
Figure 11:
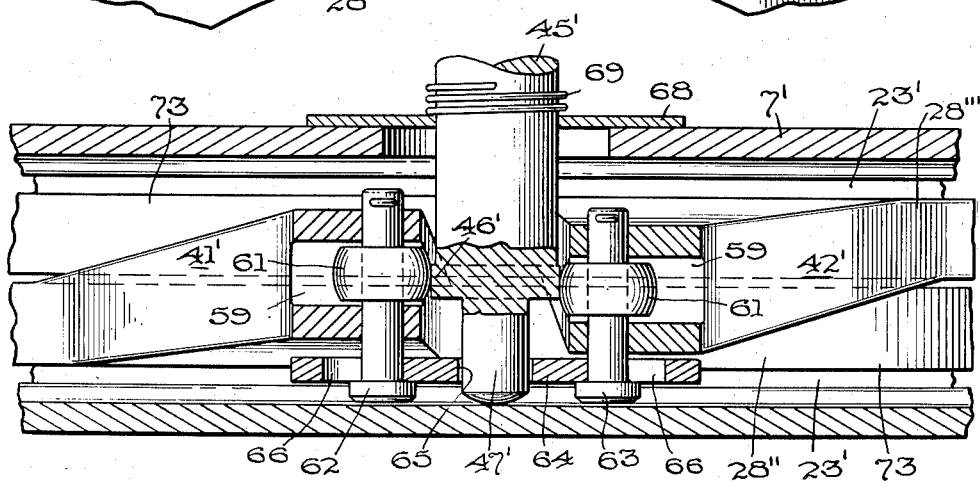
Fig. 11 is a view in section, as taken on the line 11—11 of Fig. 10.

In Fig. 14, there is shown one means for sealing the opening in the brake housing through which the actuator shaft 45 of Figs. 1 through 8 extends, and this same means can be utilized with the modified brake construction last described. In this connection, a generally rectangular sealing plate 68 is loosely fitted upon the shaft 45 in sliding contact with the outer face of the inboard housing section 7, and a coil spring 69 is disposed about the shaft 45, with one end of the spring 69 offset as at 70 and projecting into a socket in the shaft 45, while the other end of the spring 69 bears against the plate 68 to maintain the same in firm abutting contact with the brake housing. The housing section 7 is formed with a pair of guide ears 71 located along one side of the plate 68, and with a slightly arched guide ear 72 located at the other side of the plate 68, whereby the plate is maintained in overlying relationship to the opening in the housing.

In accordance with one of the objectives of this invention, the actuator discs 28'', 28''' of the brake shown in Figs. 9 through 13 are so constructed that the transverse dimensions of the brake as a whole may be maintained at a minimum for installations where space limitations impose difficulties in the manufacture of a brake of a size small enough to be utilized in a given installation, while at the same time having adequate torque capacity and strength. In this connection, the discs 28'', 28''' in the area of their inner margins are preferably relatively thin, so as to occupy a minimum of space, but the outer peripheries of the discs are provided with laterally extended flanges or enlargements, as at 73, so as to provide the actuator discs with increased strength and area for better heat dissipation.

In this type of construction, the friction discs 23' nest in the actuator discs 28'' and 28''', with the discs 23' bounded by or confined within the flanges 73, and a savings in space is accomplished equal to the thickness of the discs 28'' and 28''' which can be omitted and compensated for by the annular flange 73. This space saving results in a corresponding reduction in the overall transverse thickness of the brake assembly as a whole, and permits the brake to be installed where space allowances might otherwise preclude such an installation.

It should be understood that the first-described brake could also employ actuator discs having the marginal flanges 73 thereon, without requiring any alteration of other parts of the first-described brake, and likewise, the actuator means of the two forms of brake are readily interchangeable, one with the other, without requiring other modification of the brake as a whole.

While the specific details of the present invention have been herein shown and described, changes and alterations may be resorted to without departing from the spirit thereof as defined in the appended claim.

I claim:

Brake mechanism of the class described, comprising a housing, friction disc means in said housing including a pair of relatively rotatively and relatively axially shiftable discs for effecting engagement of the friction disc means with the housing, camming means between said discs for spreading the discs axially apart responsive to relative rotative actuation of the discs, means for actuating said discs, said actuating means including a rockable shaft extending into said housing, an actuator head on said shaft, means interposed between said head and said discs for imparting relative rotative movements to said discs responsive to rocking of said shaft in one direction, said shaft having an extension at its extreme end projecting from said head, means engaged with said extension for rockably supporting said shaft, anchor means for each disc to limit rotation of either disc in one direction while allowing the other disc to rotate, and the means engaged with said extension for supporting said shaft including a fixed bracket, said bracket having the form of a longitudinally extended channel arranged transversely to the axis of the brake, said extension having a roller thereon, and said roller being disposed in said channel to permit bodily shifting movements of said shaft lengthwise of said channel.

References Cited in the file of this patent

UNITED STATES PATENTS

| | | |
|---|---|---|
| 1,107,642 | Ball | Aug. 18, 1914 |
| 1,771,843 | Dodge | July 29, 1930 |
| 1,824,332 | Davidson et al. | Sept. 22, 1931 |
| 2,016,359 | Corbin | Oct. 8, 1935 |
| 2,071,788 | Gillett | Feb. 23, 1937 |
| 2,105,867 | Stewart | Jan. 18, 1938 |
| 2,134,512 | Hall | Oct. 25, 1938 |
| 2,255,383 | Hall | Sept. 9, 1941 |
| 2,387,039 | Parrett | Oct. 16, 1949 |
| 2,526,143 | Lambert | Oct. 17, 1950 |
| 2,592,536 | Buckendale | Apr. 15, 1952 |
| 2,650,796 | Abraham | Sept. 1, 1953 |
| 2,657,773 | Driscoll | Nov. 3, 1953 |
| 2,706,018 | DuBois | Apr. 12, 1955 |
| 2,720,943 | Kershner et al. | Oct. 18, 1955 |
| 2,728,418 | Dombeck | Dec. 27, 1955 |